US009662828B2

(12) United States Patent
Hollriegl et al.

(10) Patent No.: US 9,662,828 B2
(45) Date of Patent: May 30, 2017

(54) APPARATUS FOR CONTROLLING A TEMPERING DEVICE OF A BLOW-MOLDING MACHINE AND METHOD FOR CONTROLLING A TEMPERING DEVICE OF A BLOW-MOLDING MACHINE

(71) Applicant: KRONES AG, Neutraubling (DE)

(72) Inventors: Thomas Hollriegl, Teublitz (DE); Andrea Brunner, Aufhausen (DE); Dieter Finger, Neutraubling (DE); Harald Effenberger, Schierling (DE); Andreas Eichenseher, Bad Abbach (DE); Daniel Vogler, Neutraubling (DE)

(73) Assignee: KRONES AG, Neutraubling (DE)

( * ) Notice: Subject to any disclaimer, the term of this patent is extended or adjusted under 35 U.S.C. 154(b) by 564 days.

(21) Appl. No.: 14/174,008

(22) Filed: Feb. 6, 2014

(65) Prior Publication Data

US 2014/0264990 A1    Sep. 18, 2014

(30) Foreign Application Priority Data

Mar. 18, 2013  (DE) ........................ 10 2013 204 680

(51) Int. Cl.
 *B29C 49/78*  (2006.01)
 *B29C 49/48*  (2006.01)

(52) U.S. Cl.
 CPC ........ *B29C 49/786* (2013.01); *B29C 49/4823* (2013.01); *B29C 2049/483* (2013.01);
 (Continued)

(58) Field of Classification Search
 CPC .............. B29C 49/786; B29C 49/4823; B29C 2049/4848; B29C 2049/4851; B29C 2049/483
 See application file for complete search history.

(56) References Cited

U.S. PATENT DOCUMENTS 5,234,637 A     8/1993  Reymann et al.
5,452,999 A *  9/1995  Evans ..................... B29C 45/73
                                                                    165/263
(Continued)

FOREIGN PATENT DOCUMENTS

DE            3832284 A1      4/1990
DE    102005019890 B3     11/2006
(Continued)

OTHER PUBLICATIONS

German Search Report for Application No. 102013204680.4 dated Feb. 7, 2014.

*Primary Examiner* — Robert B Davis
(74) *Attorney, Agent, or Firm* — Marshall, Gerstein & Borun LLP

(57) ABSTRACT

An apparatus for controlling a tempering device of a blow-molding machine for tempering at least one blow mold member of a blow mold or a blow mold member carrier to a target temperature, with a device for receiving a temperature actual value of the blow mold member or the blow mold member carrier, where the temperature actual value is measured by a temperature measuring device in the blow mold member or the blow mold member carrier, devices for receiving a temperature target value of the blow mold member or the blow mold member carrier, analyzing the received temperature actual value and the received temperature target value, calculating a setting value for the tempering device from the received temperature actual value and the received temperature target value, and transmitting the setting value to the tempering device.

11 Claims, 4 Drawing Sheets

(52) U.S. Cl.
 CPC ............. *B29C 2049/4848* (2013.01); *B29C 2049/4851* (2013.01)

(56) References Cited

U.S. PATENT DOCUMENTS

| | | |
|---|---|---|
| 2004/0115294 A1 | 6/2004 | Moran et al. |
| 2011/0022193 A1* | 1/2011 | Panaitescu ............. A41D 20/00 700/29 |
| 2012/0261850 A1* | 10/2012 | Simon ................ B29C 49/4823 264/40.6 |
| 2013/0037996 A1 | 2/2013 | Fuhrer |

FOREIGN PATENT DOCUMENTS

| | | |
|---|---|---|
| DE | 102009005142 A1 | 7/2010 |
| DE | 102010028253 A1 | 10/2011 |
| DE | 102011080833 A1 | 2/2013 |
| EP | 1537976 A1 | 6/2005 |
| EP | 1717004 A1 | 11/2006 |
| EP | 1775097 A1 | 4/2007 |
| EP | 2511245 A2 | 10/2012 |

\* cited by examiner blow mold temperature temperings

| | temperature actual value | temperature target value | maximum deviation temperature | compensation temperature drop operation | compensation temperature drop standby |
|---|---|---|---|---|---|
| side members | 16 127°C | 19 130°C | 22 40°C | 24 13°C | 25 6°C |
| mold carrier | 17 55°C | 20 55°C | | | |
| base member | 18 60°C | 21 60°C | 23 8°C | | | cooling/temperings blow molds  26 on | off 27 stand-by parameters 28

| stand-by temperature | 29 90°C |
|---|---|
| stand-by time | 30 90min | start-up time

| start-up time side member temperature | 31 100s |
|---|---| production functionalities 32

FIG. 3

APPARATUS FOR CONTROLLING A TEMPERING DEVICE OF A BLOW-MOLDING MACHINE AND METHOD FOR CONTROLLING A TEMPERING DEVICE OF A BLOW-MOLDING MACHINE

CROSS-REFERENCE TO RELATED APPLICATION

The present application claims priority to German Application No. 10 2013 204 680.4, filed Mar. 18, 2013. The priority application, DE 10 2013 204 680.4, is incorporated herein by reference.

FIELD OF THE DISCLOSURE

The invention relates to an apparatus for controlling a tempering device of a blow-molding machine and a method for controlling a tempering device of a blow-molding machine.

PRIOR ART

When manufacturing hollow bodies, e.g. PET bottles using a blow-molding machine, preforms are in a first step heated to a processing temperature. In a second step, the heated preforms are molded in a blow-molding machine to the desired bottle shape. For this, the heated preforms are transferred to the blow molds, where the blow molds are preferably made of aluminum or steel, and are formed as a negative mold of the desired bottle shape. Different members of the blow mold are heated to different temperatures by a tempering medium flowing through ducts in the blow mold. The PET material is pressed against the walls of the blow mold by the formation of pressure in the preform and thereby obtains its final bottle shape. Cooling at least a part of the blow mold with water and/or oil provides for cooling the finished PET bottles.

A blow-molding machine is known from DE 10 2010 028 253 A1 comprising a fluid-operated primary function tempering system for tempering the blow molds and a fluid tempering system for tempering functional equipment components. The mold shells of the split blow molds are generally heated to a different temperature level than the base mold.

A stretch-blow-molding machine is known from DE 10 2009 005 142 A1 with a first fluid circuit for tempering a side wall and at least one further fluid circuit for tempering the base. Actuatable valves are provided for controlling the flow rate of the fluid flowing in the first fluid circuit through a heat exchanger. Furthermore, the heat flow can be controlled via the heat exchanger such that the fluid to be heated does not exceed a certain temperature. When heating the mold carrier, the side walls, and the base, a desired flow temperature of the fluid is set by controllable valves in the first and second fluid circuit using temperature measuring devices in the first and second fluid circuit. The target value of the flow temperature is predetermined from the desired temperature in the respective machine component and an additive correction value.

A device for tempering molding tools comprising at least two tempering circuits is known from EP 1 775 097 A1. The temperature of the medium can be determined in a heating apparatus with a temperature sensor arranged therein; in addition, a temperature sensor and a flow meter turbine are each provided in the return lines.

An apparatus for tempering molding tools is known from DE 10 2005 019 890 B3 with which the temperature can be regulated in different zones of a molding tool independently of each other. Each zone of the molding tool is associated with a temperature sensor for determining the actual temperature of the zone, where the temperature of tempering medium can also be determined in the molding tool itself. A temperature sensor is additionally provided to determine the flow temperature of the tempering medium prior to entering into the molding tool.

If the control unit of the tempering device is by the control unit of the blow-molding machine provided with only an analog target value, then the control unit of the tempering device can only regulate the temperature of the tempering medium, whereas the blow mold temperature is relevant for the blowing process. Due to the distance that the tempering medium must cover from the heating section to the blow mold and due to the heat transfer between the blow mold and the tempering medium, the temperature of the tempering medium leaving the heating section is generally higher than the temperature of the blow mold being heated with the tempering medium. In order to account for this temperature difference, a compensation value was previously entered manually, so that the tempering device regulates the temperature of the tempering medium respectively to a higher value in order to achieve the predetermined target temperature of the blow mold.

The temperature difference also depends on the height of the target temperature as well as on the blowing process (preform temperature, blowing wheel speed, blowing wheel size). If heat dissipation is too great, then this can only be detected by a drop in the temperature of the tempering medium and not already by a drop in temperature of the blow mold. Therefore, the tempering device can respond only slowly to changes and adjust regulation of the temperature of the tempering medium to the changed conditions.

SUMMARY

The invention is based on the objective to improve controlling a tempering device of a blow-molding machine to the effect that regulation of the temperature of the medium is not only directed at the predetermined target temperature of the medium.

No compensation values are for example thereby required for factoring in the temperature difference between the blow mold and the tempering medium, and the tempering device can thereby react faster to temperature influences caused, for example, by the blowing process or different blow mold sizes.

Solution

The apparatus for controlling a tempering device of a blow-molding machine for tempering at least one blow mold member of a blow mold, having at least two blow mold members, or a blow mold carrier to a target temperature comprises: A device for receiving a temperature actual value of the blow mold member or the blow mold carrier, where the temperature actual value is measured by a temperature measuring device in the blow mold member or its carrier (master mold or mold carrier shell) or in supply lines for the tempering medium to or discharge lines for the tempering medium from the blow mold member or its carrier, respectively; a device for receiving a temperature target value of the blow mold member, where the blow mold member or its carrier has the tempering medium of a tempering circuit flowing through it; a device for analyzing the received temperature actual value and the received temperature target value; a device for calculating a setting value for the tempering device from the received temperature actual value and the received temperature target value, and a device for transmitting the setting value to the tempering device.

The blow-molding machine can comprise a stationary and a rotating portion with blow molds, where the tempering device is arranged within the blow-molding machine. This firstly saves a significant amount of space, since, for example, no lines are necessary outside the blow-molding machine for transporting the tempering medium from the tempering device to the individual blow molds. Secondly, due to the arrangement of the tempering device within the blow-molding machine, any change in temperature of the tempering medium while being transported to the blow mold can be effectively reduced or even avoided. This partially or completely makes complex insulation of the respective lines obsolete.

By arranging all components necessary for tempering and controlling the tempering within the blow-molding machine, tempering can not only be performed more economically and in a space-saving manner, but respective connections (for example, cables and pipes, or hose lines) no longer need to be routed through the production hall in which the blow-molding machine is located when in particular the apparatus for controlling is arranged within the blow-molding machine, and risks such as, for example, damage to the respective lines can thereby be avoided.

The tempering medium can be water or oil. Water is used up to a target temperature of about 95° C., oil is mostly used as a tempering medium for higher temperatures. Different temperatures are generally used for tempering the different mold members or the carriers of the blow molds, also referred to as mold carrier shells or master molds. Typical temperatures for the mold carrier shells or master molds are between 50° C. and 60° C., and for the base member between 60° C. and 90° C., and the side members are typically tempered up to 160° C. The mold carrier shells or master molds are tempered to temperatures not that high so that the temperature difference between the hot mold (160° C.) and the ambiance (25° C.) is less, thereby reducing energy losses. The mold carriers are thereby protected from thermal strain.

By using the temperature actual value of the blow mold member, the temperature target value of the blow mold member and operating parameters of the blow-molding machine, the apparatus for controlling the tempering device is able to respond quickly to changes that are relevant for the production of the bottles. Relevant changes are presently understood to be changes which, if not accounted for and possibly corrected, would cause bottles produced under these conditions to not comply with the container specifications and not be usable.

A change in the actual temperature of the blow mold member can be gathered directly from the temperature actual value being measured by the temperature measuring device in the blow mold member which reflects the changes. In contrast to prior art, it is therefore not necessary to wait for detection of a change in temperature of the tempering medium and to then from this temperature change conclude a change in the temperature actual value of the blow mold member.

The apparatus can further comprise a device for receiving operating parameters of the blow-molding machine. The operating parameters, such as the signals "Start of Production" or "End of Production", can originate from the machine control unit of the blow-molding machine.

It can further be provided that the device for analyzing also analyzes the received operating parameters, and that the device for calculating the setting value for the tempering device also uses the received operating parameters for calculating the setting value, and that the device for transmitting transmits this setting value to the tempering device.

If, for example, an operating parameter of the blow-molding machine is changed, then this can be accounted for by the apparatus for controlling the tempering device already when performing the change and the setting value for the tempering device can be updated accordingly so that the blow mold member can be tempered accordingly. In contrast to prior art, it is therefore not necessary to wait for detection of a change in temperature of the tempering medium caused by a change of operating parameters.

The apparatus can further comprise a device for receiving a flow temperature value of the tempering medium before it flows through the blow mold member or the blow mold member carrier, where the flow temperature value is measured by a flow temperature measuring device in the tempering medium. Based on the flow temperature value, it is apparent, for example, whether the tempering medium suffers loss of heat on the way from the heating section to the blow mold or whether the tempering device can maintain its temperature, i.e. suffer no heat loss.

In addition, the apparatus can comprise a device for receiving a flow rate value of the tempering medium after flowing through the blow mold member or the blow mold member carrier, where the flow rate value is measured by a flow meter in the tempering medium. The measured flow rate value can be used to determine whether the pump output (frequency control) needs to be adjusted. Any larger leakage can also be detected.

The apparatus can comprise a device for receiving the flow temperature of the tempering medium and the return temperature of the tempering medium before and after it flows through the blow mold member or the blow mold member carrier. The measured data can be used for optimal adjustment of the flow rate, i.e. the pump output.

It can also be provided that the device for receiving the temperature actual value at predetermined times or at specified intervals or periodically transmits a request to the temperature measuring device in the blow mold member or the blow mold member carrier and in response to the request is transmitted and then receives the temperature actual value.

It can also be provided that the device for receiving the flow temperature value at predetermined times or at specified intervals or periodically transmits a request to the flow temperature measuring device in the tempering medium and in response to the request is transmitted and then receives the flow temperature value.

It can also be provided that the device for receiving the flow temperature value at predetermined times or at specified intervals or periodically transmits a request to the flow rate meter in the tempering medium and in response to the request is transmitted and then receives the flow rate value.

Furthermore, the apparatus can comprise a display device, preferably a touch screen. The display device is used, for example, to display to a user of the blow-molding machine a tabular overview of the actual values of the temperature and the target values of the temperature for the side members, the mold carriers, and the base member of a blow mold. In addition, maximum tolerable deviations from the target temperature can be displayed, which can be given without the bottles produced under such conditions needing to be sorted out.

Navigation and/or a selection within a display of the display device can be performed using a mouse, a joystick, or the like. With a touch screen, navigation and/or a selection can be accomplished by touching the screen surface of the touch screen.

A method for controlling a tempering device of a blow-molding machine for tempering at least one blow mold member of a blow mold, consisting of at least two blow mold members, or blow mold carrier to a target temperature comprises the following steps: reception of a temperature actual value of the blow mold member or the blow mold member carrier by an apparatus according to the invention for controlling the tempering device, where the temperature actual value is measured by a temperature measuring device in the blow mold member or the blow mold member carrier; reception of a temperature target value of the blow mold member or the blow mold member carrier by the apparatus, where the blow mold member or the blow mold member carrier has the tempering medium of a tempering circuit flowing through it; analyzation of the received temperature actual value and the received temperature target value; calculation of a setting value for the tempering device from the received temperature actual value and the received temperature target value by the apparatus and transmission of the setting value to the tempering device by the apparatus.

Moreover, the method can comprise the step of reception of operating parameters of the blow-molding machine by the apparatus.

It is preferably provided that the method further comprises the steps of analyzation of the received operating parameters by the apparatus, calculation of the setting value for the tempering device from the received temperature actual value, the received temperature target value, and the received operating parameters by the apparatus and transmission of this setting value to the tempering device by the apparatus.

The method can further comprise the step of reception by the apparatus of a flow temperature value of the tempering medium before it flows through the blow mold member or the blow mold member carrier, where the flow temperature value is measured by a flow temperature measuring device in the tempering medium.

In addition, the method can comprise the step of reception by the apparatus of a flow rate value of the tempering medium after it flowed through the blow mold member or the blow mold member carrier, where the flow rate value is measured by a flow meter in the tempering medium.

It can be provided that reception of the temperature actual value is temporally preceded by a transmission of a request to the temperature measuring device in the blow mold member or the blow mold member carrier at predetermined times or at specified intervals or periodically by the apparatus and transmission of the temperature actual value occurs in response to the request.

It can further be provided that reception of the flow temperature value is temporally preceded by a transmission of a request to the flow temperature measuring device in the tempering medium at predetermined times or at specified intervals or periodically by the apparatus and transmission of the flow temperature value occurs in response to the request.

It can additionally be provided that reception of the flow rate value is temporally preceded by a transmission of a request to the flow rate meter in the tempering medium at predetermined times or at specified intervals or periodically by the apparatus and transmission of the flow rate value occurs in response to the request.

The method further comprises the step of displaying a display on a display device, preferably like a touch screen.

BRIEF DESCRIPTION OF THE FIGURES

Further advantages and embodiments arise from the accompanying drawings:

FIG. 3 shows a display of the display device for the blow mold temperature; and

DETAILED DESCRIPTION OF THE PREFERRED EMBODIMENTS

Figure 1:
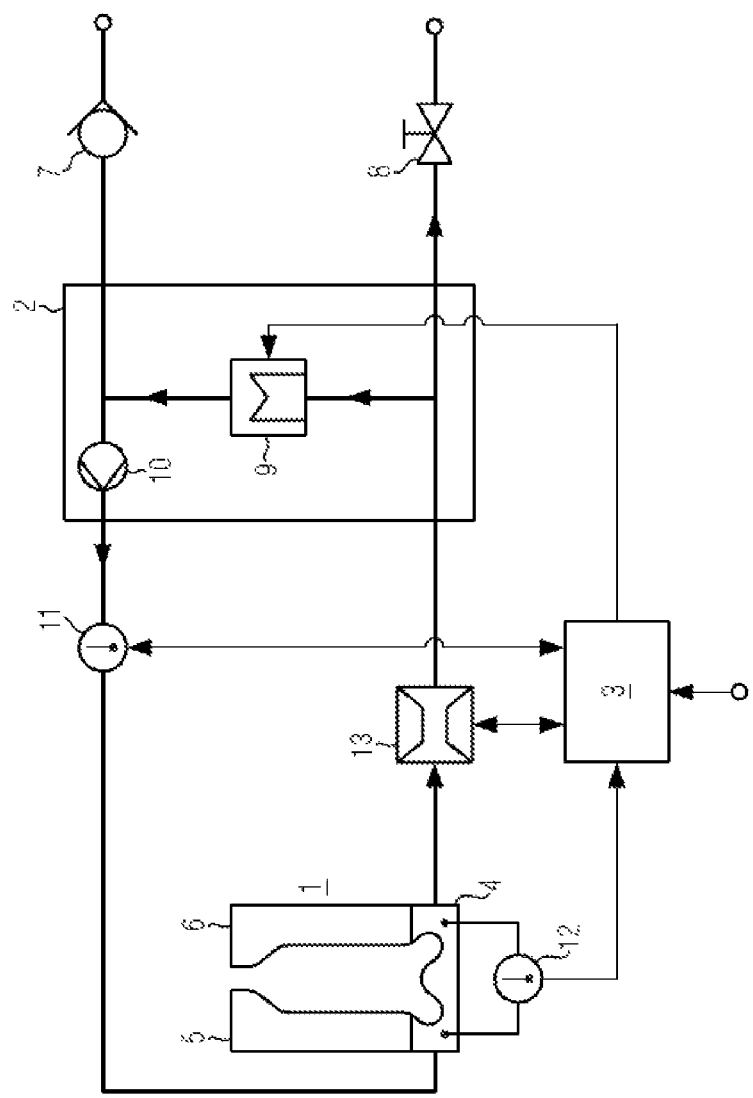
FIG. 1 shows a schematic representation of an apparatus for controlling a tempering device of a blow-molding machine for tempering the base member of a blow mold.

FIG. 1 shows an arrangement by way of example of a blow mold 1 and a tempering device 2 in which an apparatus 3 according to the invention is provided for controlling the tempering device 2 of a blow-molding machine for tempering the base member 4 of the blow mold 1 to a target temperature.

The blow mold 1 illustrated is composed of three blow mold members: a base member 4 and two side members 5, 6. A blow mold 1 can also comprise two or more than three blow mold members; the blow mold members can generally be connected to each other and detached from each other such that insertion of a preform and removal of the formed bottle is possible without any problem.

The tempering medium is transported via a line system. The tempering circuit can via a check valve 7 be supplied with a tempering medium having a first temperature, where said first temperature exhibits values that are less than the temperature of the heated tempering medium or a predetermined temperature value. The control valve 8 can be opened to drain tempering medium from the circuit and conversely to add medium having the first temperature to the circuit via the check valve. This can lead to lowering the tempering medium temperature, for example, by 5° C., 10° C. or 15° C., to a greater reduction of the temperature by, for example, more than 25° C. or to completely replace the tempering medium already existing in the line system with a tempering medium having the first temperature. By complete replacement with the tempering medium having the first temperature, cooling of the blow mold member and thereby of the formed bottle in the blow mold 1 can be achieved. The tempering circuit further comprises a control valve 8 with which the tempering medium can be drained from the tempering circuit in a controlled manner to avoid, for example, that the pressure in the line system becomes too high or the temperature rises to a level that possibly leads to damage. The tempering device 2 comprises a heating section 9 being provided for heating the tempering medium flowing through the heating section 9 and a pump 10 being provided for circulating the tempering medium in the line system.

A so-called flow temperature of the tempering medium can be measured prior to flowing through the base member 4 by a flow temperature measuring device 11 in the line. The flow temperature value of the tempering medium is transmitted to the apparatus 3 for controlling the tempering device 2. Transmission can occur at predetermined times or at specified intervals or periodically. It can also be provided that the flow temperature value of the tempering medium is queried by the apparatus 3 for controlling at predetermined times or at specified intervals or periodically.

The tempering medium is passed through ducts in the base member 4 of the blow mold 1 so that the base member 4 is heated by heat transfer between the tempering medium and the base member 4 when the temperature of the tempering medium is higher than the temperature of the base member 4, or the base member 4 is cooled when the temperature of the tempering member is lower than the temperature of the base member 4.

The temperature actual value of the base member 4 is measured by a temperature measuring device 12 in the base member; the temperature actual value represents the current temperature value of the base member 4 which the base member 4 has at the time of measurement. FIG. 1 only illustrates one such temperature measuring device 12, but it is also possible to attach multiple temperature measuring devices at various points of the base member 4 to thereby obtain an average temperature actual value of the base member 4 over a larger area of the base member 4. If measurement directly at the mold is not possible, then the flow or return temperature of the medium can also be measured in the lines near the mold.

The temperature actual value of the base member 4 is transmitted to the apparatus 3 for controlling the tempering device 2. Transmission can occur at predetermined times or at specified intervals or periodically. It can also be provided that the temperature actual value of the base member is at predetermined times or at specified intervals or periodically queried by the apparatus 3 for controlling.

The flow rate of the tempering medium can be measured with a flow meter 13 after flowing through the base member 4. The measured flow rate value can be used to control the pump output. Controlling the flow rate is advantageous with increasing temperature especially for media having strong changes in viscosity, because the pump output can be reduced with increasing temperature at a constant flow rate. The flow rate value is transmitted to the apparatus 3 for controlling the tempering device 2. Transmission can occur at predetermined times or at specified intervals or periodically. It can also be provided that the flow rate value is queried by the apparatus 3 at predetermined times or at specified intervals or periodically.

A target temperature for the base member 4 is entered into the apparatus 3 for controlling. This target temperature is to be reached and maintained by use of the tempering medium. In addition, the apparatus 3 has access to operating parameters of the blow-molding machine so that a setting value results for the tempering device 2 as a function f(target temperature, process data). This setting value is transmitted by the apparatus 3 to the tempering device 2. The setting value contains information as to how the heating section 9, the check valve 7, the pump 10 and the control valve 8 are to be operated.

If, for example, the temperature actual value of a blow mold member exceeds the temperature target value for a predetermined period of time, for example, during 2, 3 or 4 minutes or longer or shorter, by a predetermined value, for example, 5° C., 10° C., 15° C. or more or less, then the tempering device 2 switches from a heating to a cooling mode. The heating section 9 is then no longer actuated, but the control valve 8 being arranged in the connection of the tempering medium return line of the tempering device 2 opens. In this manner, the hot tempering medium can escape and tempering medium having the first temperature, i.e. relatively cold tempering medium, can flow in via the check valve 7. If the flow temperature reaches a certain value, e.g. 5° C., 10° C., 15° C. below the previously measured temperature actual value, then the control valve 8 again closes. The temperature actual value of the blow mold member has due to this process dropped by a few degrees Celsius and is again in the range of the temperature target value.

Figure 2:
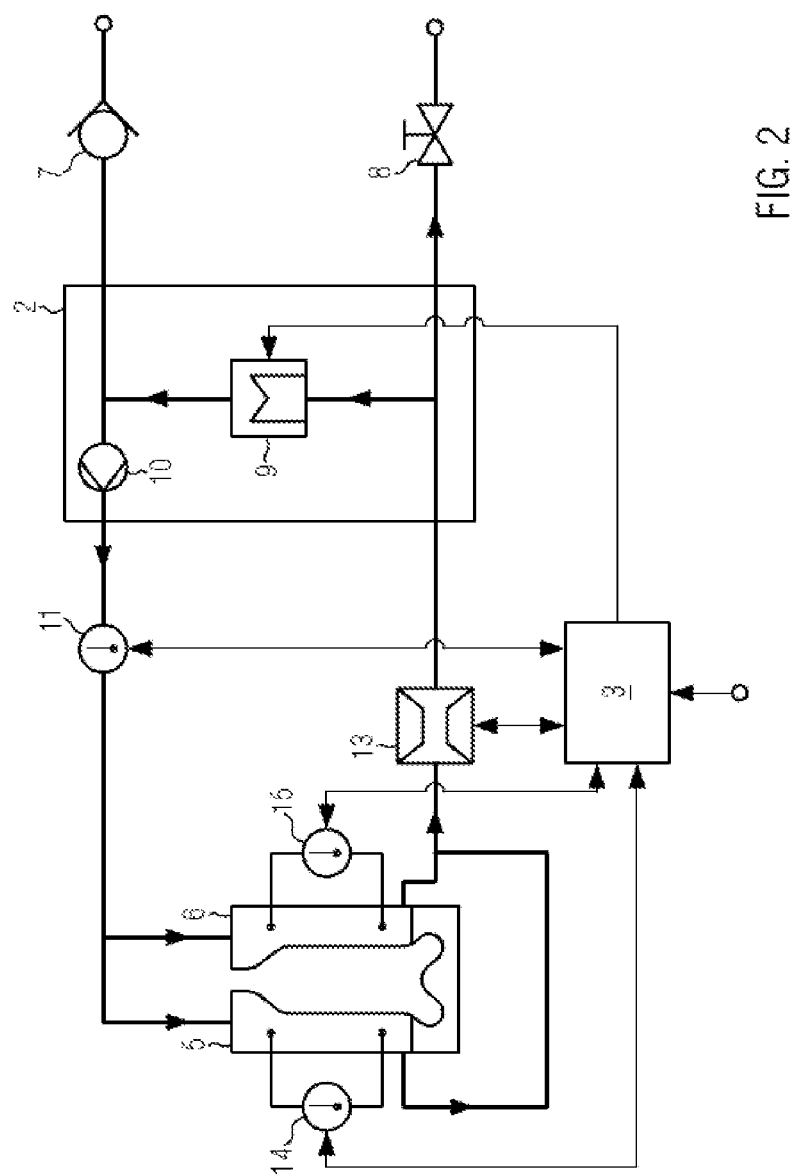
FIG. 2 shows a schematic representation of an apparatus for controlling a tempering device of a blow-molding machine for tempering the side members of a blow mold.

FIG. 2 shows an arrangement by way of example of a blow mold 1 and a tempering device 2 in which an apparatus 3 according to the invention is provided for controlling the tempering device 2 of a blow-molding machine for tempering both side members 5, 6 of the blow mold 1 to a target temperature. The elements in FIG. 2 are substantially identical to those in FIG. 1. The tempering medium in FIG. 2 merely flows through ducts in the two side members 5, 6 or the blow mold member carrier of the blow mold 1 and does not flow through the base member 4 of the blow mold 1. The tempering medium is passed via ducts through the side members 5, 6 of the blow mold 1, so that the side members 5, 6 are heated due to a heat transfer between the tempering medium and the side members 5, 6 when the temperature of the tempering medium is higher than the temperature of the side members 5, 6, or the side members 5, 6 are cooled when the temperature of the tempering medium is lower than the temperature of the side members 5, 6, respectively.

The temperature actual value of the two side members 5, 6 are—as illustrated—each measured by a temperature measuring device 14, 15 in a side member 5, 6. FIG. 2 illustrates only one such temperature measuring device 14, 15 for each side member 5, 6, but it is also possible to attach multiple temperature measuring devices at different locations of each of the two side members 5, 6 in order to thereby obtain an average temperature actual value of the side members 5, 6 across a larger area of the side members 5, 6. If measurement directly at the mold is not possible, the flow or, and the return temperature of the medium can also be measured in the lines near the mold.

The temperature actual value of the side members 5, 6 is transmitted to the apparatus 3 for controlling the tempering device 2. Transmission can occur at predetermined times or at specified intervals or periodically. It can also be provided that the temperature actual values of the side members 5, 6 are queried by the apparatus 3 at predetermined times or at specified intervals or periodically.

The flow rate of the tempering medium after flowing through the side members 5, 6 can be measured with a flow meter 13. The measured flow rate value can be used to control the pump output. Controlling the flow rate is advantageous with increasing temperature especially for media having strong changes in viscosity because the pump output can be reduced with increasing temperature at a constant flow rate. The flow rate value is transmitted to the apparatus 3 for controlling the tempering device 2. Transmission can occur at predetermined times or at specified intervals or periodically. It can also be provided that the flow rate value is at predetermined times or at specified intervals or periodically queried by the apparatus 3 for controlling.

A value for the target temperature of the side members 5, 6 is entered into the apparatus 3 for controlling. This target temperature is to be reached and maintained by use of the tempering medium flowing through the side members 5,6. In addition, the apparatus 3 has access to operating parameters of the blow-molding machine so that a setting value results for the tempering device 2 as a function f(target temperature, process data). This setting value is transmitted by the apparatus 3 to the tempering device 2. The setting value contains information as to how the heating section 9, the check valve 7, the pump 10 and the control valve 8 are to be operated.

FIG. 3 shows a display 33 of the display device of the apparatus 3 for controlling the tempering device 2 regarding the blow mold temperature. Actual values 17, 17, 18 of the temperature and target values 19, 20, 21 of the temperature are presently specified in a table for the side members 5, 6, the mold carriers and the base member 4. The actual values 16, 17, 18 correspond to the temperature values measured by the temperature measuring devices 12, 14, 15 in the side members 5, 6, in the mold carrier or in the base member 4, respectively. The target values 19, 20, 21 of the temperature correspond to the temperature values which the respective members of the blow mold 1 are to exhibit; these values are predetermined. Tolerable maximum deviations 22, 23 from the target temperature 19, 21 that may arise before the production is automatically stopped are also specified for the side walls 5, 6 and the base member 4. Values for compensation 24 of the temperature drop during operation or for compensation 25 of the temperature drop for the mold wall during standby are also specified. These compensations are required, inter alia, due to the high target temperature 19 of the side members 5, 6, or various other process parameters, such as the mold carrier mass, the output performance of the machine or the preform temperature, respectively.

It can be selected using the two push-buttons whether cooling/tempering of the blow molds 1 is to be switched on 26 or off 27.

The standby temperature 29—presently 90° C.—and the standby time 30—presently 90 minutes—can be selected as standby parameters 28 of the side members 5, 6 to avoid excessive energy loss.

The start-up time 31 for the temperature of the side members 5, 6 after standby can also be selected; in the case illustrated, 100 seconds are selected as the start-up time 31.

Figure 4:
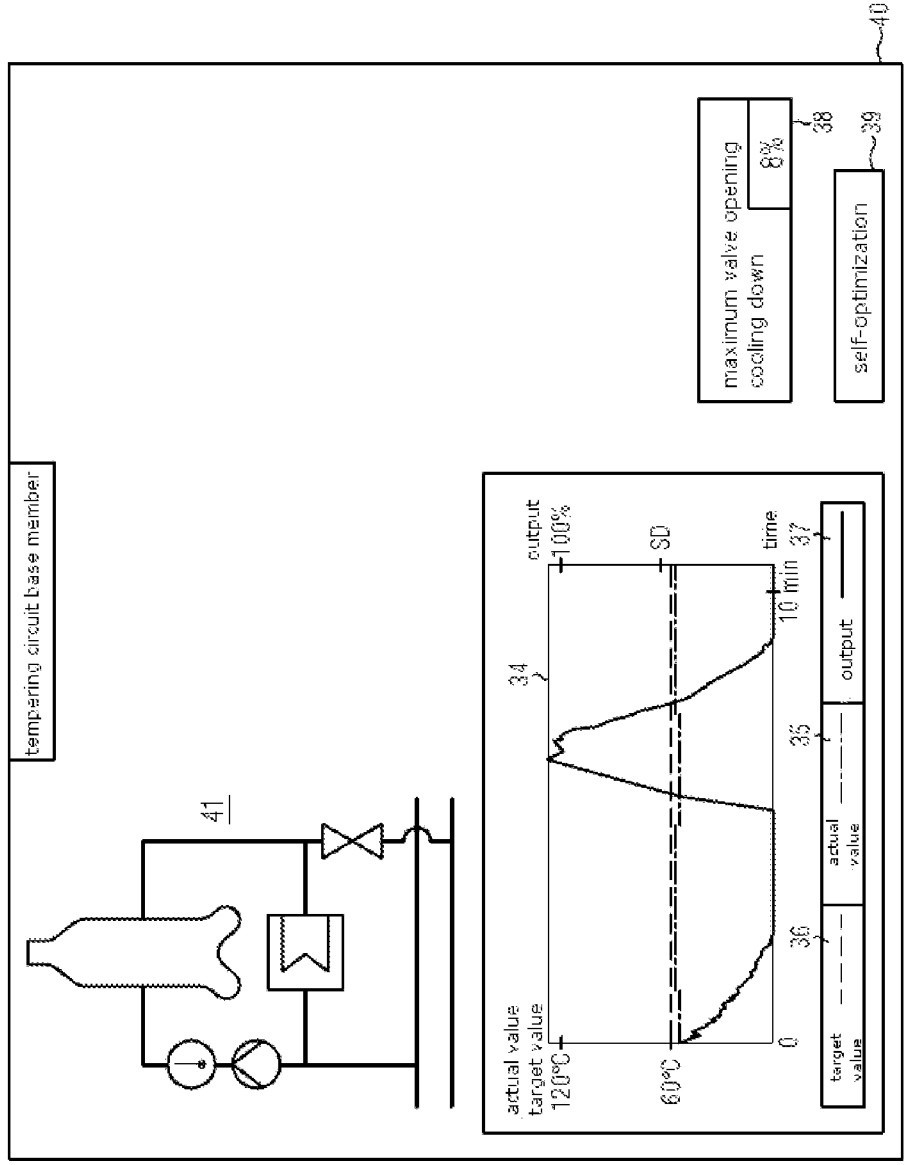
FIG. 4 shows a display of the display device for internal tempering.

FIG. 4 shows a display 40 of the display device of the apparatus 3 for controlling the tempering device 2 regarding the tempering circuit of the base member 4. A diagram 34 shows the curve of the actual value 35 (dash-dotted line) of the temperature in ° C., the curve of the target value 36 (dashed line) of the temperature in ° C., and the curve of the output 37 % (solid line), i.e. the heating output of the heating section, as a function of time in minutes. The target value 36 of the base member 4 is 60° C. If the actual value 35 drops below the target value 36, the heating output of the heating section 9 of the tempering device 2 is regulated, for which the output 37 is controlled accordingly.

The display 40 of the display device also shows a schematic view 41 of the tempering circuit of the base member 4.

In addition, the value of the maximum valve opening 38 for cooling down can be selected; in the case illustrated, it was selected to be 8%.

Furthermore, self-optimization 39 of the parameters can be selected.

A display as shown in FIG. 4 can be provided in analogy for a tempering circuit of the side members 5, 6 and/or a tempering circuit for the mold carrier.

The invention claimed is:

1. An apparatus for controlling a tempering device of a blow-molding machine for tempering at least one blow mold member of a blow mold having one of at least two blow mold members, or a blow mold carrier to a target temperature, the apparatus comprising:

a device communicatively coupled for receiving a temperature actual value of said blow mold member or said blow mold member carrier, where said temperature actual value is measured by a temperature measuring device in at least two of a group including the blow mold member, said blow mold carrier, and in supply lines for delivery of a tempering medium to the blow mold member or the blow mold carrier, respectively;

the device communicatively coupled for receiving a temperature target value of one of the blow mold member or the blow mold member carrier, where said blow mold member or said blow mold member carrier has the tempering medium of a tempering circuit flowing through it;

the device communicatively coupled for analyzing said received temperature actual value and said received temperature target value;

the device communicatively coupled for calculating a setting value for said tempering device from said received temperature actual value and the received temperature target value; and the device communicatively coupled for transmitting the setting value to the tempering device.

2. The apparatus according to claim 1, further comprising a device for receiving operating parameters of the blow-molding machine.

3. The apparatus according to claim 2, where the device for analyzing also analyzes the received operating parameters, where the device for calculating the setting value for the tempering device also uses the received operating parameters for calculating the setting value, and where the device for transmitting transmits the setting value to the tempering device.

4. The apparatus according to claim 1, further comprising a device for receiving a flow temperature value of the tempering medium before it flows through one of the blow mold member or the blow mold member carrier, where the flow temperature value is measured by a flow temperature measuring device in the tempering medium.

5. The apparatus according to claim 4, further comprising a device for receiving a flow rate value of the tempering medium after it flowed through one of the blow mold member or the blow mold member carrier, where the flow rate value is measured by a flow meter in the tempering medium.

6. The apparatus according to claim 1, where the device for receiving the temperature actual value at one of predetermined times, specified intervals, periodically, is configured to transmit a request to the temperature measuring device in the one of blow mold member or the blow mold member carrier and in response to the request the temperature actual valve is transmitted and then received.

7. The apparatus according to claim 4, where the device for receiving the flow temperature value at one of predetermined times, specified intervals or periodically, is configured to transmit a request to the flow temperature measuring device in the tempering medium and in response to the request the flow temperature valve is transmitted and received.

8. The apparatus according to claim 5, where the device for receiving the flow rate value at one of predetermined times, specified intervals, or periodically, is configured to transmit a request to said flow rate meter in the tempering medium and in response to the request, the flow rate valve is transmitted and then received.

9. The apparatus according to claim 1, further comprising a display device.

10. An apparatus for controlling a tempering device of a blow-molding machine for tempering at least one blow mold member of a blow mold having one of at least two blow mold members, or a blow mold carrier to a target temperature, the apparatus comprising:
- a device for receiving a temperature actual value of said blow mold member or said blow mold member carrier, where said temperature actual value is measured by a temperature measuring device in the blow mold member, said blow mold carrier, in supply lines for delivery a tempering medium to the blow mold member or the blow mold carrier, or in discharge lines for carrying the tempering medium from the blow mold member or said carrier, respectively,
- the device communicatively coupled for receiving a temperature target value of one of the blow mold member or the blow mold member carrier, where said blow mold member or said blow mold member carrier has the tempering medium of a tempering circuit flowing through it;
- the device communicatively coupled for analyzing said received temperature actual value and said received temperature target value;
- the device communicatively coupled for calculating a setting value for said tempering device from said received temperature actual value and the received temperature target value, and
- the device communicatively coupled for transmitting the setting value to the tempering device;
- the device communicatively coupled for receiving a flow temperature value of the tempering medium before it flows through one of the blow mold member or the blow mold member carrier, where the flow temperature value is measured by a flow temperature measuring device in the tempering medium; and
- the device communicatively coupled for receiving a flow rate value of the tempering medium after it flowed through one of the blow mold member or the blow mold member carrier, where the flow rate value is measured by a flow meter in the tempering medium.

11. A system having at least one of a blow mold having one of at least two blow mold members, or a blow mold carrier, the system comprising:
- a tempering circuit coupled to the blow mold or the blow mold carrier, the tempering circuit comprising:
  - supply lines for delivery of a tempering medium to the blow mold or the blow mold carrier, and
  - discharge lines for carrying the tempering medium from the blow mold member or the blow mold carrier,
- a tempering device of a blow-molding machine for tempering at least one of a blow mold member of the blow mold or the blow mold carrier to a target temperature via the tempering circuit, and
- an apparatus for controlling the tempering device, the apparatus comprising:

a device communicatively coupled for receiving a temperature actual value of said blow mold member or said blow mold member carrier, where said temperature actual value is measured by a temperature measuring device in the blow mold member, said blow mold carrier, in the supply lines, or in the discharge lines, respectively,
- the device communicatively coupled for receiving a temperature target value of one of the blow mold member or the blow mold member carrier, where said blow mold member or said blow mold member carrier has the tempering medium of a tempering circuit flowing through it,
- the device communicatively coupled for analyzing said received temperature actual value and said received temperature target value,
- the device communicatively coupled for calculating a setting value for said tempering device from said received temperature actual value and the received temperature target value, and
- the device communicatively coupled for transmitting the setting value to the tempering device.

* * * * *